United States Patent
Rawson et al.

(10) Patent No.: US 6,808,639 B2
(45) Date of Patent: Oct. 26, 2004

(54) METHOD AND APPARATUS FOR REDUCING THE AMOUNT OF HYDROGEN SULFIDE IN EFFLUENT OF A WATER HEATER

(75) Inventors: James Rulon Young Rawson, Clifton Park, NY (US); Richard Leland Butsch, Louisville, KY (US)

(73) Assignee: General Electric Company, Schenectady, NY (US)

( * ) Notice: Subject to any disclaimer, the term of this patent is extended or adjusted under 35 U.S.C. 154(b) by 98 days.

(21) Appl. No.: 10/316,281

(22) Filed: Dec. 11, 2002

(65) Prior Publication Data

US 2004/0112844 A1 Jun. 17, 2004

(51) Int. Cl.[7] .................................................. C02F 1/74
(52) U.S. Cl. ...................... 210/758; 210/742; 210/766; 210/149; 210/175
(58) Field of Search ................................ 210/742, 758, 210/766, 149, 175

(56) References Cited

U.S. PATENT DOCUMENTS 5,168,546 A    12/1992 Lapperriere et al.
5,808,277 A     9/1998 Dosani et al.
5,882,588 A  *  3/1999 Laberge ........................ 422/28

OTHER PUBLICATIONS

J.M. Odium and R. Singleton, "The Sulfate—Reducing Bacteria: Contemporary Perspective," Eds. pp. 1–20 (1992).

* cited by examiner

Primary Examiner—Betsey Morrison Hoey
(74) Attorney, Agent, or Firm—Kilpatrick Stockton LLP

(57) ABSTRACT

The present invention relates to a method and apparatus for reducing the amount of hydrogen sulfide in the effluent of a water heater. A water heater of the present invention comprises an aeration device comprising a pump connected to a tube connected to an air sparging unit. The water heater may further comprise a programmable thermostat capable of controlling the temperature of the water in the water heater. The method of the present invention comprises the step of periodically or constantly passing a plurality of air bubbles through the water contained in a water heater. The method may further comprise the step of heating the water in the water heater.

18 Claims, 1 Drawing Sheet

METHOD AND APPARATUS FOR REDUCING THE AMOUNT OF HYDROGEN SULFIDE IN EFFLUENT OF A WATER HEATER

FIELD OF THE INVENTION

This invention relates to water heaters. In particular, this invention relates to a method and an apparatus for reducing the amount of hydrogen sulfide in the effluent of a water heater.

BACKGROUND OF THE INVENTION

Two forms of sulfur are commonly found in drinking water supplies: sulfate and hydrogen sulfide. Hydrogen sulfide is a nuisance gas producing an offensive "rotten egg" or "sulfur water" odor and taste in the water. In some cases, hydrogen sulfide can form via the microbial reduction of sulfate. Occasionally, this odor may be noticeable when water is initially drawn from a water heater. Other problems associated with hydrogen sulfide in drinking water supplies include its corrosiveness to metals such as iron, steel, copper and brass. When it off-gases from the water in a home, it can also tarnish silverware and discolor copper and brass utensils. Hydrogen sulfide can also cause yellow or black stains on kitchen and bathroom fixtures. Coffee, tea and other beverages made with water containing hydrogen sulfide may be discolored and the appearance and taste of cooked foods can be negatively affected. Therefore, it would be advantageous to have a system to reduce the formation of unpleasant odors and taste in drinking water caused by the formation of hydrogen sulfide in water heaters.

SUMMARY OF THE INVENTION

The present invention provides a method and an apparatus to reduce the amount of hydrogen sulfide in the effluent of a hot water heater. The invention reduces the amount of hydrogen sulfide in the effluent of a hot water heater by the periodic or constant aeration of the water in a water heater. The periodic or constant aeration of the water in a water heater may also be combined with the periodic pasteurization of the water in a water heater.

The water heater of this invention comprises an aeration device comprising a pump connected to a tube, wherein the tube is connected to an air sparging unit.

The method of the present invention comprises the step of passing a plurality of air bubbles through the water contained in a water heater, wherein the amount of dissolved oxygen is maintained at or above 2 ppm.

DETAILED DESCRIPTION OF THE INVENTION

Figure 1:
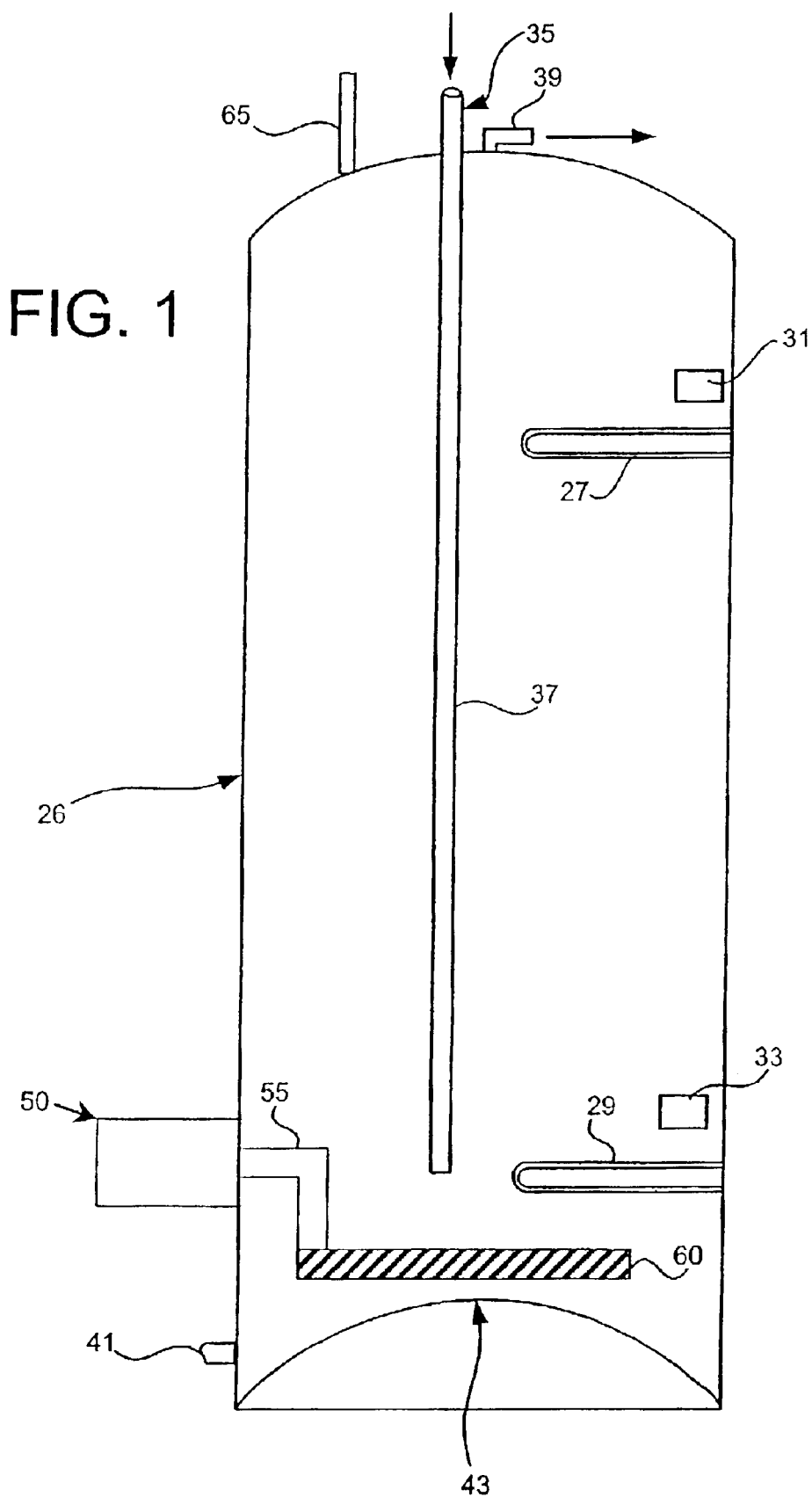
FIG. 1 is a diagrammatic vertical cross section of a water heater comprising an aeration device.

Sulfate-reducing bacteria (SRB), which use sulfur in the form of sulfate as an oxidant, are the primary producers of large quantities of hydrogen sulfide in drinking water. These bacteria biochemically reduce natural sulfates in water to hydrogen sulfide. Sulfate-reducing bacteria may live in oxygen-deficient environments such as deep wells and plumbing systems. These sulfate-reducing bacteria may also flourish in a water heater of a residential water distribution system.

A water heater can be the primary source of hydrogen sulfide odor in residential drinking water. With consumers' concern over higher energy prices, many consumers have reduced the thermostat setting in their water heater to save energy. Unfortunately, at temperatures below 40° C., bacteria, including sulfate-reducing bacteria, can proliferate in water heaters. As these sulfate-reducing bacteria grow and, if there is an appreciable level of sulfate in the water, the sulfate-reducing bacteria may reduce the sulfate to form hydrogen sulfide in the water, and the effluent water can have a foul odor and bad taste.

Sulfate-reducing bacteria produce the hydrogen sulfide by the biochemical reduction of sulfate salts in water. These bacteria normally can only grow and produce hydrogen sulfide in the absence of oxygen (anaerobic conditions). The amount of dissolved oxygen present in a water heater is typically below 1 ppm. An environment with less than 1 ppm of dissolved oxygen is sufficiently anaerobic to allow sulfate-reducing bacteria to multiply and produce hydrogen sulfide. The periodic or constant aeration of the water can increase the amount of dissolved oxygen in the water of a water heater to about 2 ppm or above. When dissolved oxygen in the water in a water heater is maintained at or above 2 ppm, the sulfate-reducing bacteria should not be able to grow and produce hydrogen sulfide. In addition, sulfate-reducing bacteria normally only grow and produce hydrogen sulfide at temperatures below about 65° C. Periodically maintaining an environment at about 65° C. or above should reduce or eliminate the amount of sulfate-reducing bacteria in a water heater.

The present invention provides a water heater capable of reducing or eliminating foul odors and bad taste from its effluent that are produced by sulfate reducing bacteria. The water heater of the present invention can reduce or eliminate foul odors and bad taste from its effluent by reducing the amount of hydrogen sulfide present in the effluent of the water heater. The amount of hydrogen sulfide present in the effluent of a water heater can be reduced by controlling the growth of sulfate-reducing bacteria The growth of sulfate-reducing bacteria can be controlled with periodic or constant aeration of the water in a water heater. The growth of sulfate-reducing bacteria can also be controlled with periodic elevation of the temperature of the water in a hot water heater to about 65° C. or above. The growth of sulfate-reducing bacteria in a water heater can also be controlled with periodic or constant aeration of the water in combination with periodic elevation of the temperature of the water to about 65° C. or above.

Even if sulfate-reducing bacteria are not present in a water heater, the amount of hydrogen sulfide in the effluent of a water heater can be reduced with periodic or constant aeration of the water in the water heater. Maintaining the level of dissolved oxygen in water at about 2 ppm or above with periodic or constant aeration can promote the oxidation of hydrogen sulfide into sulfate, which does not impart a rotten egg taste and odor to water. Periodic or constant aeration of the water in a water heater also promotes the degassing of dissolved hydrogen sulfide in the water thereby reducing the amount hydrogen sulfide in the effluent of a water heater.

Again, even if sulfate-reducing bacteria are not present in the water heater, the amount of hydrogen sulfide in the effluent of a water heater can be reduced with periodic elevation of the temperature of the water in a water heater to about 65° C. or above. Periodic elevation of the temperature of the water in a water heater to about 65° C. or above also promotes the degassing of dissolved hydrogen sulfide in the water.

The combination of periodic or constant aeration of the water in a water heater in combination with periodic elevation of the temperature of the water in the water heater to about 65° C. or above should also promote the degassing of dissolved hydrogen sulfide in the water.

In one aspect, the present invention provides a water heater comprising an aeration device. In one embodiment, the aeration device comprises a pump connected to a tube, which is connected to an air sparging unit. The tube may comprise copper or stainless steel. The air sparging unit is positioned to introduce air bubbles into the water contained in the water heater. The air sparging unit may be located at or near the bottom of the water heater. The air sparging unit comprises any material that will disperse the air pushed through the tube into small bubbles. Examples of an air sparging unit include a sintered (porous) stainless steel stone and sintered glass. Other examples of air sparging units include, but are not limited to, ceramic dome fine bubble diffusers, downflow coarse bubble diffusers, plenum coarse bubble diffusers, membrane check valve fine bubble diffusers, and tubular check valve fine bubble diffusers.

The dissolved oxygen in the water of a water heater can be maintained at or above 2 ppm by periodically or constantly bubbling air into the water with the aeration device using air blowers designed to propel gases to the diffusers at 0.1–0.5 cubic foot per minute. An appropriate air pressure release valve should be included to vent the water heater to preclude build up of air pressure. The air pressure release valve should work in tandem with a second pressure release valve to control the pressure in the tank. The amount of dissolved oxygen may be in the range of 2 to 5 ppm. An alternative is to use a compressor pump to fill a small pressure tank with air that will periodically release air into the water heater. The release of air from the pressure tank into the water heater can be controlled with a pressure differential check valve that detects a change in pressure in the water heater.

FIG. 1 illustrates, diagrammatically, a water heater comprising an aeration device. There is shown a water heater having a capacity of 175 liters (40 gallons) provided with two immersed heating elements 27 and 29 of 3 kW each, controlled by thermostats 31 and 33. Cold water comes into the water heater at 35 by means of a dip-tube 37, which opens slightly above the lower heating element 29. Drainage is obtained by means of valve 41. The bottom 43 of the tank is inwardly curved.

In this one non-limiting illustration, the aeration device comprises a pump 50 that draws in air from the surrounding environment and pushes it through a tube 55 which is connected to an air sparging unit 60. The air sparging unit may take the form of a cylinder or a disk extending horizontally through the water in the water heater comprising the materials discussed above. The water heater further includes a relief valve 65 to release gases from the water heater into the surrounding environment.

In another embodiment, the water heater of the present invention comprises an aeration device in combination with a programmable thermostat capable of controlling the temperature of the water heater. The programmable thermostat is capable of periodically raising the temperature of the water in a water heater to 65° C. or above. The period in which the water is heated to 65° C. or above can range from 10 to 30 minutes. The period can also be longer or shorter than 10 to 30 minutes. An example of a programmable thermostat capable of controlling the temperature of a water heater according to the present invention can be found in U.S. Pat. No. 5,808,277 to Dosani et al.

In another aspect, the present invention provides a method of aerating water in a water heater to reduce the amount of hydrogen sulfide in the effluent. This method comprises the step of periodically or constantly passing a plurality of air bubbles through the water contained in a water heater. The duration and rate of air passing through the water of the water heater will depend on the amount of hydrogen sulfide in the water, the desired level of dissolved oxygen, and other factors. The greater the amount of hydrogen sulfide dissolved in the water or the greater the desired level of dissolved oxygen may require either increasing the duration of passing air through the water of the water heater or increasing the rate of air passing through the water of the hot water heater or both.

In one embodiment, the method comprises the step of passing a plurality of air bubbles through the water contained in a water heater, wherein the amount of dissolved oxygen is maintained at or above 2 ppm. In another embodiment, the amount of dissolved oxygen is maintained between about 2 to 5 ppm.

In another embodiment, the method of the present invention further comprises the step of heating the water in the water heater. The steps of passing air and heating the water may occur in any order or simultaneously. In an preferred embodiment, the step of heating the water in the water heater raises the temperature of the center of a water heater to a pasteurization temperature. In another embodiment, the step of heating the water in the hot water heater raises the temperature of the water in the water heater to between 65 and 70° C. In another embodiment, the step of heating the water in the water heater raises the temperature of the water in the hot water heater to between 65 and 70° C. for 10 to 30 minutes, followed by the subsequent cooling of the water to that temperature normally maintained by the water heater. In another embodiment, the step of heating the water in the water heater raises the temperature of the water and the internal surface of the water heater to the pasteurization temperature. Pasteurization temperature is the temperature at which sulfate reducing bacteria are killed or destroyed.

While various embodiments have been described in detail and by way of illustration, it will be understood that various modifications and substitutions may be made in the described embodiments without departing from the spirit and scope of the invention as defined by the appended claims.

We claim:

1. A water heater comprising an aeration device.

2. The water heater of claim 1, wherein the aeration device comprises a pump connected to a tube connected to an air sparging unit, wherein the air sparging unit is positioned inside the water heater to introduce air bubbles into the water contained in the water heater.

3. The water heater of claim 2, wherein the air sparging unit is positioned at or near the bottom of the water heater.

4. The water heater of claim 2, wherein the air sparging unit comprises a material capable of dispersing air into small bubbles when air is pushed through the tube by the pump.

5. The water heater of claim 4, wherein the air sparging unit comprises sintered stainless steel stone, sintered glass, a ceramic dome fine bubble diffusers, downflow coarse bubble diffusers, a plenum coarse bubble diffusers, a membrane check valve fine bubble diffusers, or a tubular check valve fine bubble diffusers.

6. The water heater of claim 1, wherein the aeration device is capable of maintaining the amount of dissolved oxygen in the water in the water heater at or above 2 ppm.

7. The water heater of claim 6, wherein the aeration device is capable of maintaining the amount of dissolved oxygen in the water in the water heater between about 2 to 5 ppm.

8. The water heater of claim 1 further comprising a programmable thermostat capable of controlling the temperature of the water of the water heater.

9. The water heater of claim 8, wherein the programmable thermostat is capable of raising the temperature of the water in the water heater to about 65° C. or above for about 10 to 30 minutes.

10. A method comprising:

periodically or constantly passing a plurality of air bubbles through the water contained in a water heater.

11. The method of claim 10, wherein the amount of dissolved oxygen is maintained at or above 2 ppm.

12. The method of claim 11, wherein the amount of dissolved oxygen is maintained between about 2 to 5 ppm.

13. The method of claim 10 further comprising:

heating the water in the water heater.

14. The method of claim 13, wherein the steps of passing a plurality of air bubbles and heating the water occur in any order or simultaneously.

15. The method of claim 13, wherein the step of heating the water in the water heater raises the temperature of the center of the water in the water heater to pasteurization temperature.

16. The method of claim 13, wherein the step of heating the water in the water heater raises the temperature of the water in the water heater to between about 65 to 70° C.

17. The method of claim 16, wherein the step of heating the water in the water heater raises the temperature of the water in the water heater to between about 65 to 70° C. for 10 to 30 minutes.

18. The method of claim 13, wherein the step of heating the water in the water heater raises the temperature of the water and the internal surface of the water heater to pasteurization temperature.

* * * * *